UNITED STATES PATENT OFFICE.

JULES HENRI LAVOLLAY AND GUSTAVE EUGÈNE BOURGOIN, OF PARIS, FRANCE.

PROCESS OF PURIFYING WATER.

SPECIFICATION forming part of Letters Patent No. 666,533, dated January 22, 1901.

Application filed July 10, 1900. Serial No. 23,091. (No specimens.)

*To all whom it may concern:*

Be it known that we, JULES HENRI LAVOLLAY, chemical engineer, and GUSTAVE EUGÈNE BOURGOIN, mechanical engineer, of 3 Rue Froment, Paris, in the Republic of France, have invented a new Process of Purifying Water, of which the following is a specification.

This invention has relation to a process for purifying all kinds of water—such as sink-water, river-water, and the like—for rendering the same wholesome.

The process consists, essentially, in subjecting the contaminated water to the simultaneous action of a powdered insoluble manganate, preferably an alkaline-earth-metal manganate in suspension, and electric current. The result of this process is the energetic oxidizing action necessary for destruction of pathological germs and the like, the water being left in excellent condition and fit for use.

Our process is carried on by adding to the contaminated water calcium manganate, for instance, in powdered form in the proportion of from twenty to fifty grams per hectoliter of water, maintaining the same in suspension and simultaneously passing through the mass an electric current of a density varying from two to ten amperes per square meter, according to the condition of the water. This treatment should be continued from five to ten minutes, after which the water may be filtered or otherwise cleaned and is then in thoroughly sanitary condition and free from germs.

What we claim is—

1. The method of rendering insoluble manganates efficient for the bettering and sterilizing of contaminated waters which consists in reducing the insoluble manganate to a powder, maintaining the same in suspension in the water to be treated and in passing through the mass an electric current during such suspension.

2. The method of bettering and sterilizing contaminated waters which consists in maintaining in suspension in the water a powdered alkaline-earth-metal manganate and simultaneously subjecting said water and manganate to the action of an electric current.

In witness whereof we have hereunto signed our names, this 23d day of June, 1900, in the presence of two subscribing witnesses.

JULES HENRI LAVOLLAY.
GUSTAVE EUGÈNE BOURGOIN.

Witnesses:
AUGUSTE TOURNOL,
PAUL TOURNOL.